J. Carpenter,

Fork.

No. 106,464.        Patented Aug. 16, 1870.

Witnesses

Inventor
Jesse Carpenter
Alexander Mason
Attys.

United States Patent Office.

JESSE CARPENTER, OF NICONZA, INDIANA.

Letters Patent No. 106,464, dated August 16, 1870.

---

IMPROVEMENT IN COMBINED SHOVEL AND DUNG-FORK.

---

The Schedule referred to in these Letters Patent and making part of the same

---

To all whom it may concern:

Be it known that I, JESSE CARPENTER, of Niconza, in the county of Miami and in the State of Indiana, have invented certain new and useful Improvements in Combined Shovel, Dung-Fork, and Hook; and do hereby declare that the following is a full, clear, and exact description thereof, reference being had to the accompanying drawing, and to the letters of reference marked thereon, making a part of this specification.

The nature of my invention consists in the construction and arrangement of a "combined shovel, dung-fork, and hook," as will be hereinafter fully set forth.

In order to enable others skilled in the art to which my invention appertains to make and use the same, I will now proceed to describe its construction and operation, referring to the annexed drawing, in which—

Figure 1:
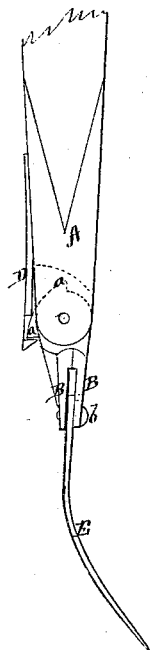

Figure 1 is a side view, and

Figure 2:
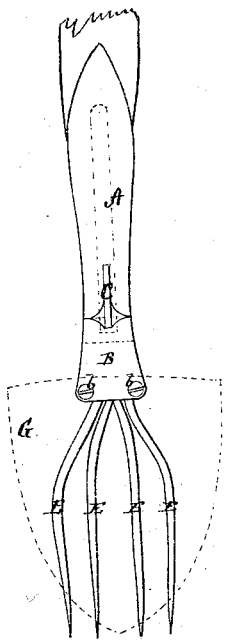

Figure 2, a front view of my invention.

A represents the handle, which is slotted or forked at its lower end, as seen in fig. 2.

B B are two jaws, made of one piece, or of two pieces firmly secured together, and having at their base a circular projection, C, which is inserted in the forked end of the handle A, and there pivoted by means of a pin or bolt passing through them.

This projection C is provided with two lugs or ratchet-teeth, $a\ a$, as shown in fig. 1, and a spring-bar, D, slotted at its outer end, is secured to the handle A, so that one of the lugs $a$ may project through its slot, and thus the jaws be held securely either in a straight or rectangular position from the handle.

Between the jaws B B the tines E E are secured, by means of two screws, $b\ b$, which can readily be removed, the tines taken out, and the shovel G inserted and fastened in their place.

Having thus fully described my invention,

What I claim as new, and desire to secure by Letters Patent, is—

The arrangement of the slotted handle A, jaws B B, projection C, lugs $a\ a$, spring bar D, and the movable tines E and set-screws $b\ b$, all constructed to operate substantially as set forth.

In testimony that I claim the foregoing, I have hereunto set my hand this 25th day of February, 1870.

JESSE CARPENTER.

Witnesses:
JOSEPH CARPENTER,
JOHN CHAMBER.